United States Patent
Huang et al.

(10) Patent No.: US 9,973,958 B2
(45) Date of Patent: May 15, 2018

(54) SYSTEMS, METHODS, AND DEVICES FOR IMPROVED INTER-FREQUENCY MEASUREMENT

(71) Applicant: Intel IP Corporation, Santa Clara, CA (US)

(72) Inventors: Rui Huang, Beijing (CN); Yang Tang, Pleasanton, CA (US); Yujian Zhang, Beijing (CN); Hong He, Beijing (CN); Candy Yiu, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 67 days.

(21) Appl. No.: 14/497,514

(22) Filed: Sep. 26, 2014

(65) Prior Publication Data

US 2015/0215803 A1 Jul. 30, 2015

Related U.S. Application Data

(60) Provisional application No. 61/933,843, filed on Jan. 30, 2014.

(51) Int. Cl.
*H04W 24/10* (2009.01)
(52) U.S. Cl.
CPC .................. *H04W 24/10* (2013.01)
(58) Field of Classification Search
CPC ..................................... H04W 24/10
See application file for complete search history.

(56) References Cited

U.S. PATENT DOCUMENTS

2007/0037601 A1 2/2007 Mittal et al.
2007/0184834 A1* 8/2007 Jeong .................... H04W 24/08
455/434

(Continued)

FOREIGN PATENT DOCUMENTS

WO 2013025160 A1 2/2013
WO 2013151404 A1 10/2013

OTHER PUBLICATIONS

PCT/US2015/013691, International Search Report and Written Opinion, May 15, 2015, 12 pages.

(Continued)

*Primary Examiner* — Yemane Mesfin
*Assistant Examiner* — Henry Baron
(74) *Attorney, Agent, or Firm* — Stoel Rives LLP (57) ABSTRACT

Systems and methods for improved inter-frequency measurement are disclosed herein. User equipment (UE) may be configured to communicatively couple to an Evolved Universal Terrestrial Radio Access Network (E-UTRAN) Node B (eNB). The eNB may determine a measurement pattern indicating when the UE should perform inter-frequency measurements. The measurement pattern may be selected such that the UE performs measurements more often than once per measurement cycle. The measurement pattern may be selected to balance timing requirements for the UE with increased power consumption that may result from more frequent measurements. The eNB may determine the measurement pattern based on an estimate of UE speed and a number of frequencies to be monitored. A default pattern may be used if the UE speed and/or number of frequencies do not exceed predetermined thresholds.

20 Claims, 7 Drawing Sheets

(56) References Cited

U.S. PATENT DOCUMENTS

| | | | |
|---|---|---|---|
| 2008/0189970 A1* | 8/2008 | Wang | H04W 36/0055 33/701 |
| 2011/0237202 A1* | 9/2011 | Uemura | H04W 36/0088 455/67.14 |
| 2012/0163198 A1 | 6/2012 | Chin et al. | |
| 2012/0295610 A1* | 11/2012 | Deng | H04W 24/10 455/423 |
| 2012/0307670 A1 | 12/2012 | Kazmi et al. | |

OTHER PUBLICATIONS

Seung, et al., "Radio Protocols for LTE and LTE-Advanced Paragraph 3.7 UE Capability Transfer to 3.9 Measurement Control", Radio protocols for LTE and LTE advanced, Aug. 23, 2012, pp. 65-76.

* cited by examiner

SYSTEMS, METHODS, AND DEVICES FOR IMPROVED INTER-FREQUENCY MEASUREMENT

RELATED APPLICATIONS

This application claims priority to and the benefit of U.S. Provisional Patent Application No. 61/933,843, filed Jan. 30, 2014, which is hereby incorporated by reference herein in its entirety.

TECHNICAL FIELD

The present disclosure relates to systems, methods, and devices for improved inter-frequency measurement of one or more carrier frequencies.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet.

LTE networks include radio access technology and core radio network architecture that provide high data rate, low latency, packet optimization, and improved system capacity and coverage. In LTE networks, an eNB may communicate with a UE using Frequency Division Duplexing (FDD). The UE may move relative to an eNB to which the UE is coupled, so the signal strength and/or quality of the coupled eNB may decline and the eNB may no longer satisfy selection criteria. The UE may attempt to determine whether the signal from another eNB is stronger and/or higher quality. For example, the eNB may instruct the UE to measure the Reference Signal Received Power (RSRP), the Reference Signal Received Quality (RSRQ), and/or the like of another eNB. The UE may perform inter-frequency measurements of one or more FDD carriers associated with other eNBs. Depending on the results of the inter-frequency measurements, the UE may be handed over to another eNB. As used herein, measuring a frequency or measuring an FDD carrier refers to a measurement (e.g., an inter-frequency measurement) of a signal (e.g., the RSRP, RSRQ, and/or the like of that signal) at that frequency or for that FDD carrier.

UE performance may be improved if the UE is able to perform inter-frequency measurements on a large number of FDD carriers. For example, the UE may monitor between two and five UTRA FDD carriers and/or between four and eight E-UTRA FDD carriers. The UE may monitor a total of eight to sixteen FDD carriers. However, the length of time required to perform the inter-frequency measurements may increase linearly with the number of FDD carriers being monitored. The time required to perform inter-frequency measurements may be calculated according to the equation:

$$T_{Identify\_Inter} = T_{Basic\_Identify\_Inter} \frac{T_{Measurement\_Period\_Inter}}{T_{Inter1}} N_{Freq} \quad (1)$$

Where $T_{Identify\_Inter}$ is the time required to perform the inter-frequency measurements, $T_{Basic\_Identify\_Inter}$ is the basic time required to perform a measurement for a single FDD carrier, $T_{Measurement\_Period\_Inter}$ is the duration of a measurement period, $T_{Inter1}$ is the minimum time during the measurement period that is available for inter-frequency measurements, and $N_{Freq}$ is the number of FDD carriers for which inter-frequency measurement should be performed.

In addition, other inter-frequency measurement requirements, such as $T_{detect}$, $T_{measure}$, and $T_{evaluate}$, may need to be relaxed to support the larger number of measurements. As a result, the time required to perform inter-frequency measurements may become quite large. For example, in a connected state with a measurement gap repetition period (MGRP) of 80 ms and no ongoing discontinuous reception (DRX), $T_{Basic\_Identify\_Inter}$ may be 480 ms; $T_{Measurement\_Period\_Inter}$ may be 480 ms; and $T_{Inter1}$ may be 30 ms. Thus, it may take 61,440 ms to measure eight FDD carriers. A UE travelling 60 mph (100 km/h) may travel over a mile (over 1.7 km) in the time required to measure all eight FDD carriers. However, such a distance may be much larger than is covered by a typical cell. The UE will be unable to perform inter-frequency measurements on all eight FDD carriers before a handover is required. As a result, UE traffic may be interrupted and/or lost for UEs in the connected state.

The length of time required to perform the inter-frequency measurements for all the FDD carriers may be reduced by using a shorter MGRP (e.g., a period of 40 ms rather than a period of 80 ms) and/or by measuring all the FDD carriers in a single measurement cycle. A UE moving at high speed may then be able to complete the inter-frequency measurements in the necessary amount of time. However, power consumption by the UE may be significantly increased when using the shorter measurement gap pattern and/or measuring all the FDD carriers in a single measurement cycle. The reduction in measurement time may be balanced against the increased power consumption to provide an optimal trade-off between delay and power consumption. To do so, the eNB may determine when the UE should measure each FDD carrier and indicate the determined time to the UE.

In an embodiment, a mobility control unit, such as a Mobility Management Entity (MME) and/or a serving gateway (S-GW), may estimate the UE's speed. The speed may be expressed as a number or by classifying the speed into any of a plurality of states (e.g., a high speed state, a low speed state, etc.). The MME may transmit the estimated speed to an eNB serving the UE for use in determining the measurement pattern. The serving eNB may determine the measurement pattern based on the speed of the UE, the number of FDD carriers to be measured, the coverage area of the eNB, and/or the like. For example, the serving eNB may specify a default pattern when a UE is moving at a low speed and/or when the number of FDD carriers to be measured is below a predetermined threshold. The default pattern may indicate that the UE should measure one FDD carrier per measurement cycle. Power consumption may be minimized because the total duration of the measurements may not be critical for UE performance.

When the UE is moving at a high speed and/or the number of FDD carriers is greater than the predetermined threshold, the serving eNB may determine a measurement pattern that measures the FDD carriers more frequently than the default pattern. In an embodiment, the measurement pattern may be expressed as a bitmap indicating when within a measurement cycle the measurements should be performed. Each element of the bitmap may correspond to a measurement opportunity within the measurement cycle. For example, the bitmap may indicate a frame, half-frame, and/or subframe when a measurement should occur. There may be a one-to-one mapping between elements of the bitmap and occasions when measurement can occur and/or begin. In some embodiments, the measurement cycle may correspond to a Discontinuous Reception (DRX) interval, and the measurement pattern may indicate a measurement pattern within that DRX cycle. A value of one for an element of the bitmap may indicate that a measurement should take place at the corresponding measurement opportunity and a value of zero may indicate that a measurement should not take place. A bitmap containing all zeroes may be used as the default pattern that indicates one FDD carrier should be measured per cycle. A separate measurement pattern may be determined for each FDD carrier. Thus, a particular bitmap may be associated with one FDD carrier and may only indicate when measurements should be performed for that FDD carrier. The serving eNB may be responsible for ensuring that a plurality of bitmaps for the same measurement cycle are compatible with the capabilities of the UE (e.g., that the UE is not required to perform more simultaneous measurements than it is able to perform).

The serving eNB may transmit an indication of the measurement pattern (e.g., the bitmap) to the UE. The measurement pattern can be determined and transmitted on a static, a semi-static, or a dynamic basis (e.g., determined and transmitted once per cycle or less frequently). The indication of the measurement pattern may be transmitted to the UE using higher layer signaling, such as a Radio Resource Control (RRC) reconfiguration message. The measurement pattern may be included as part of a measurement object within a measurement configuration Information Element (IE). There may be a measurement object, including a measurement pattern, for each FDD carrier to be measured by the UE. The UE may receive the RRC message and may perform the measurements at the times indicated by the measurement pattern (or according to the default schedule associated with the default pattern). The UE may report the measurement results back to the serving eNB. The measurement report may have the same format regardless of whether the default pattern or another measurement pattern was transmitted to the UE.

Thus, by the eNB defining a measurement pattern, the UE may be able to avoid connection problems due to the length of time required to perform inter-frequency measurements. In addition, the measurement pattern may allow power consumption to be made as low as possible while still satisfying the time constraints for performing the measurements. The flexibility in specifying the measurement pattern may allow UEs and eNBs under different conditions to optimize the measurement schedule for their particular situation. UEs and eNBs that implement measurement patterns may be backwardly compatible with UEs and eNBs that do not because most variables, such as the MGRP, do not need to be changed from currently permissible values.

Figure 1:
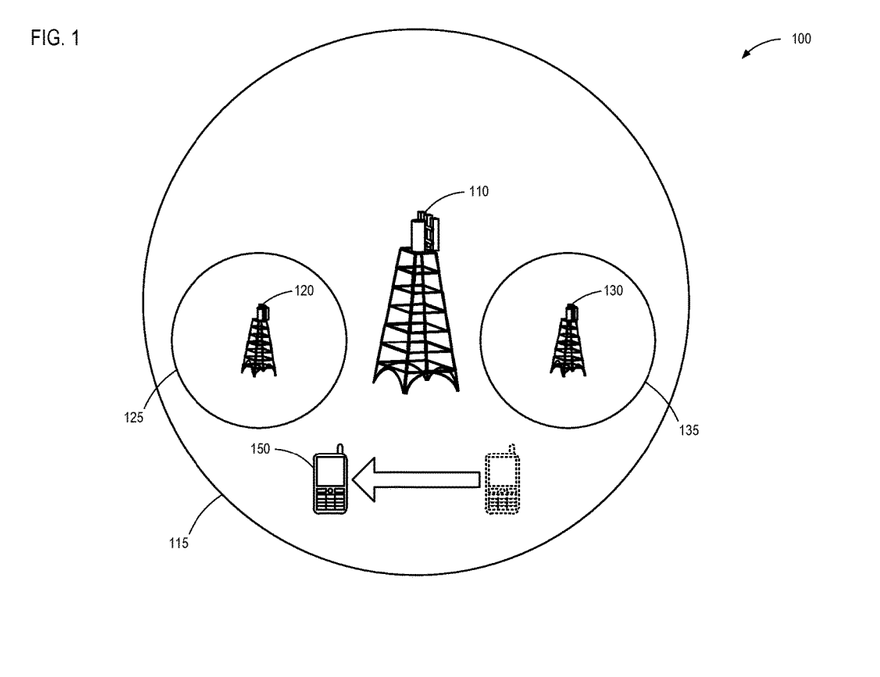
FIG. 1 is a schematic diagram of a system comprising a plurality of eNBs with corresponding cell coverage areas.

FIG. 1 is a schematic diagram of a system 100 comprising a plurality of eNBs 110, 120, 130 with corresponding cell coverage areas 115, 125, 135. A UE 150 may be coupled to a macro eNB 110 and may be travelling at high speed through the coverage area 115. The eNB 110 may indicate to the UE 150 that it should perform inter-frequency measurements on FDD carriers associated with nearby eNBs 120, 130. The UE 150 may perform inter-frequency measurements on FDD carriers associated with femto cells, pico cells, micro cells, other macro cells, etc. The inter-frequency measurements may include measurements of RSRP, RSRP, and/or the like for each nearby eNB 120, 130. If there are a large number of nearby eNBs 120, 130, it may take a long time for the UE 150 to perform the inter-frequency measurements. In such a situation, the UE 150 may leave the coverage area 115 of the macro eNB 110 before it has finished the measurements. A target eNB 120, 130 may not have been selected for handover, so communication by the UE 150 with a remote entity may be disrupted.

Figure 2A:
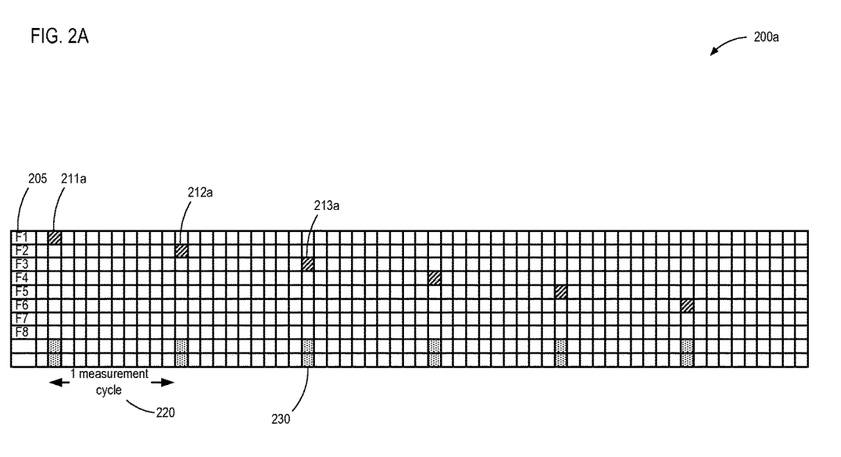
FIG. 2A is a schematic diagram of a measurement schedule for a plurality of FDD carriers according to one embodiment.

FIG. 2A is a schematic diagram of a measurement schedule 200a for a plurality of FDD carriers 205 according to one embodiment. The measurement schedule 200a may be an illustrative representation of when and where measurements are performed by the UE. The measurement schedule 200a may include a plurality of measurement cycles (e.g., the measurement cycle 220). In an embodiment, the duration of the measurement cycle 220 may correspond to the MGRP. Each measurement cycle 220 may be further divided into a plurality of measurement occasions (e.g., the measurement occasions 230, etc.). The measurement occasions may be frames, half-frames, subframes, and/or the like in which an inter-frequency measurement can be performed by a UE. The measurement schedule 200a is also separated by FDD carrier 205. Each block in the measurement schedule may correspond to a measurement occasion and an FDD carrier 205. If the block is illustrated as shaded, it indicates that the UE should perform a measurement of the corresponding FDD carrier 205 at the corresponding measurement occasion. If the block is illustrated as not shaded, then no measurement should be performed.

The illustrated measurement schedule 200 may indicate that the UE will perform one measurement 211a-213a of one FDD carrier 205 in each measurement cycle 220. For example, a first measurement 211*a* of a first of the FDD carriers 205 may be performed in the first measurement cycle 220; a second measurement 212*a* may be of a second FDD carrier in a second measurement cycle; and a third measurement 213*a* may be of a third FDD carrier in a third measurement cycle. Each measurement 211*a*-213*a* may only be performed during an initial measurement occasion 230, which may correspond to a measurement gap. As a result, very few measurements 211*a*-213*a* are performed during the illustrated time period. A large number of measurement cycles 220 may be required for the UE to adequately measure each FDD carrier 205. For example, several measurement occasions may be required for the UE to completely measure an FDD carrier 205, so the UE may have to cycle through the FDD carriers 205 several times before it has adequately measured all the FDD carriers 205.

Figure 2B:
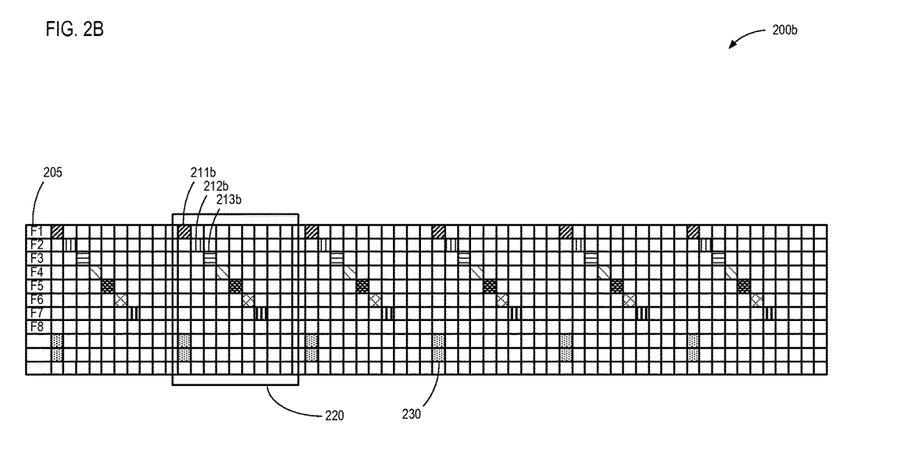
FIG. 2B is a schematic diagram of a measurement schedule for a plurality of FDD carriers according to another embodiment.

FIG. 2B is a schematic diagram of a measurement schedule 200*b* for a plurality of FDD carriers 205 according to another embodiment. The measurement schedule 200*b* may be similarly divided into a plurality of FDD carriers 205 and a plurality of measurement cycles 220, which may include a plurality of measurement occasions (e.g., the initial measurement occasion 230). However, the UE may measure all the FDD carriers 205 during a measurement cycle 220 rather than just a single FDD carrier 205. For example, a first measurement 211*b* may occur during a first measurement occasion in a measurement cycle 220; a second measurement 212*b* may occur during a second measurement occasion in the same measurement cycle 220; a third measurement 213*b* may occur during a third measurement occasion in the same measurement cycle 220, etc.

The measurements 211*b*-213*b* may be performed during measurement occasions other than the initial measurement occasion 230 in each measurement cycle 220. Each measurement 211*b*-213*b* may still be performed in during a unique measurement occasion. Because every FDD carrier 205 is measured in each measurement cycle 220, fewer measurement cycles 220 may be required to adequately measure all the FDD carriers 205 even if multiple measurements are needed for each FDD carrier 205. However, significantly more power may be required to perform the measurements 211*b*-213*b* because so many more measurements 211*b*-213*b* are being performed in each measurement cycle 220. The UE may need to measure the FDD carriers 205 more quickly than is possible with the first measurement schedule 200*a* but may not need to measure the FDD carriers 205 as quickly as the second measurement schedule 200*b* allows. Accordingly, the UE may save power while still meeting time requirements by measuring the FDD carriers 205 at a rate between those provided by the first and second measurement schedules 200*a* and 200*b*.

Figure 3:
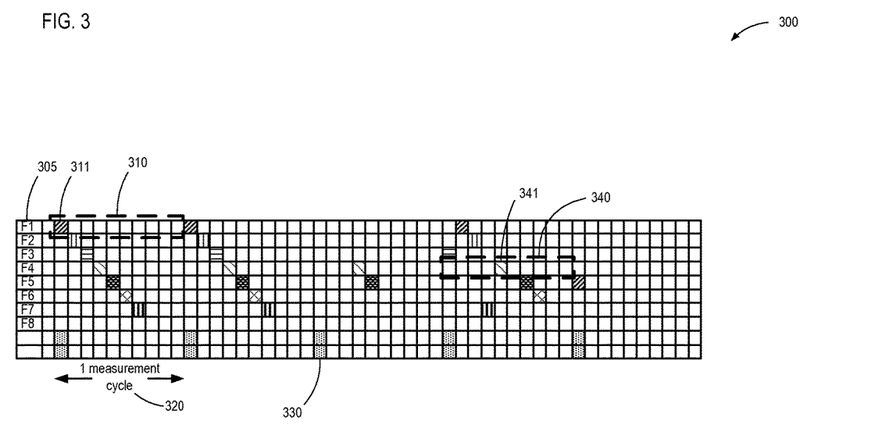
FIG. 3 is a schematic diagram of a measurement schedule for a plurality of FDD carriers according to still another embodiment.

FIG. 3 is a schematic diagram of a measurement schedule 300 for a plurality of FDD carriers 305 according to still another embodiment. The measurement schedule 300 may be similarly divided into a plurality of FDD carriers 305 and a plurality of measurement cycles 320, which may each be divided into a plurality of measurement occasions (e.g., the initial measurement occasion 330). The measurements (e.g., the measurements 311, 341) illustrated by the measurement schedule 300 may have been specified by measurement patterns transmitted to a UE by a serving eNB. The UE may still measure one or more FDD carriers 305 in each measurement cycle 320, and the UE may still perform measurement during measurement occasions other than the initial measurement occasion 330 in each measurement cycle 320. However, the timing of the measurements 311, 341 may have been specified by the measurement patterns rather than being a predefined and/or predetermined scheme.

The measurement patterns may be specified for each FDD carrier 305 and each measurement cycle 320. For example, each measurement pattern may be a bitmap. The length of the bitmap may correspond to the number of measurement occasions in each measurement cycle 320 (e.g., 10 bits in the illustrated embodiment). The UE may measure during the measurement cycle specified by the measurement pattern. A measurement pattern associated with a first measurement cycle 310 of a first FDD carrier may have indicated that a measurement 311 should occur during the first measurement occasion for that cycle. In addition, a measurement pattern associated with a fourth measurement cycle 340 of a fourth FDD carrier may have indicated that a measurement 341 should occur during the fifth measurement occasion for that cycle. As can be appreciated, the measurement patterns may be selected so that there is more than one measurement per measurement cycle but less than one measurement per FDD carrier per measurement cycle. Measurements may be performed quickly enough to meet time requirements while minimizing power consumption.

Figure 4:
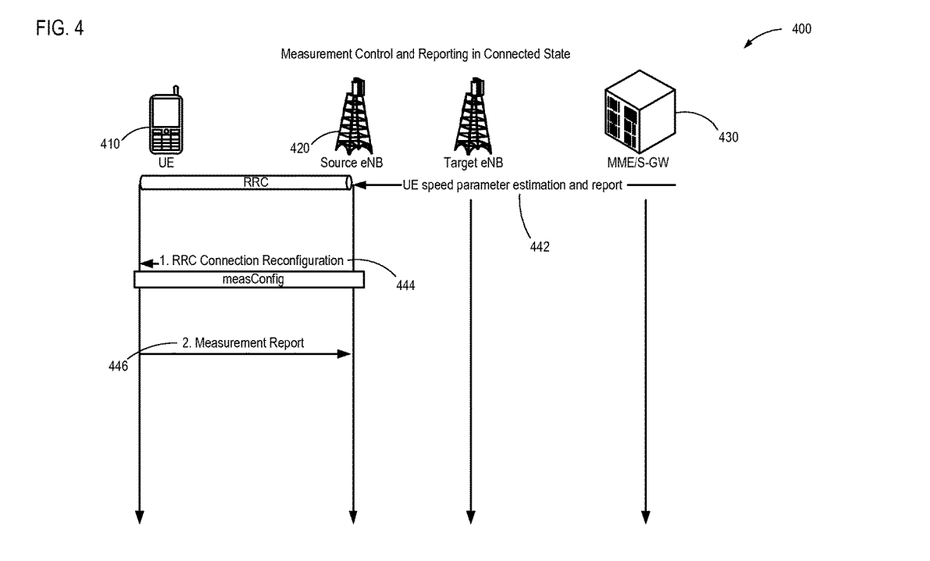
FIG. 4 is a schematic diagram of communications between a source eNB and a UE to configure a measurement pattern to be used by the UE.

FIG. 4 is a schematic diagram 400 of communications between a source eNB 420 and a UE 410 to configure a measurement pattern to be used by the UE 410. A MME and/or S-GW 430 may estimate a speed of the UE 410. The speed may be estimated by classifying the UE 410 into one or a plurality of speed states (e.g., a high speed state and a low speed state). The MME/S-GW may transmit an indication 442 of the estimated speed and/or speed state to the source eNB 420. From the indication 442 of the estimated speed and/or speed state, the source eNB 420 may determine a measurement pattern that should be transmitted to the UE 410.

The source eNB 420 may transmit the measurement pattern to the UE 410 using higher layer signaling (e.g., an RRC Connection Reconfiguration message 444). The RRC message 444 may include a measurement configuration IE. The measurement configuration IE may include a measurement ID, a measurement object ID, one or more measurement objects, a report configuration ID, a report configuration, a quantity configuration, a gap pattern, an S-measure, and/or the like. Each measurement object may include measurement parameters including a measurement pattern indicating when the measurement should occur. The measurement pattern may be a bitmap that corresponds to a measurement cycle and/or a DRX interval. Each element in the bitmap may correspond to a measurement occasion (e.g., a frame, a half-frame, a subframe, etc.). For example, in an embodiment, the measurement interval may be 10 subframes long, and the bitmap may include 10 elements with each corresponding to a subframe.

Once the UE 410 has performed the measurement(s), the UE 410 may transmit a measurement report 446 back to the source eNB 420. The measurement report may include a physical cell ID, a measurement type, a measurement ID, a measurement object ID, a report configuration ID, and/or the like. The measurement report may not need to include a measurement pattern and may be the same regardless of which measurement pattern is used, so the measurement pattern may be omitted. Based on the measurement report, it may be determined whether a handover should occur.

Figure 5:
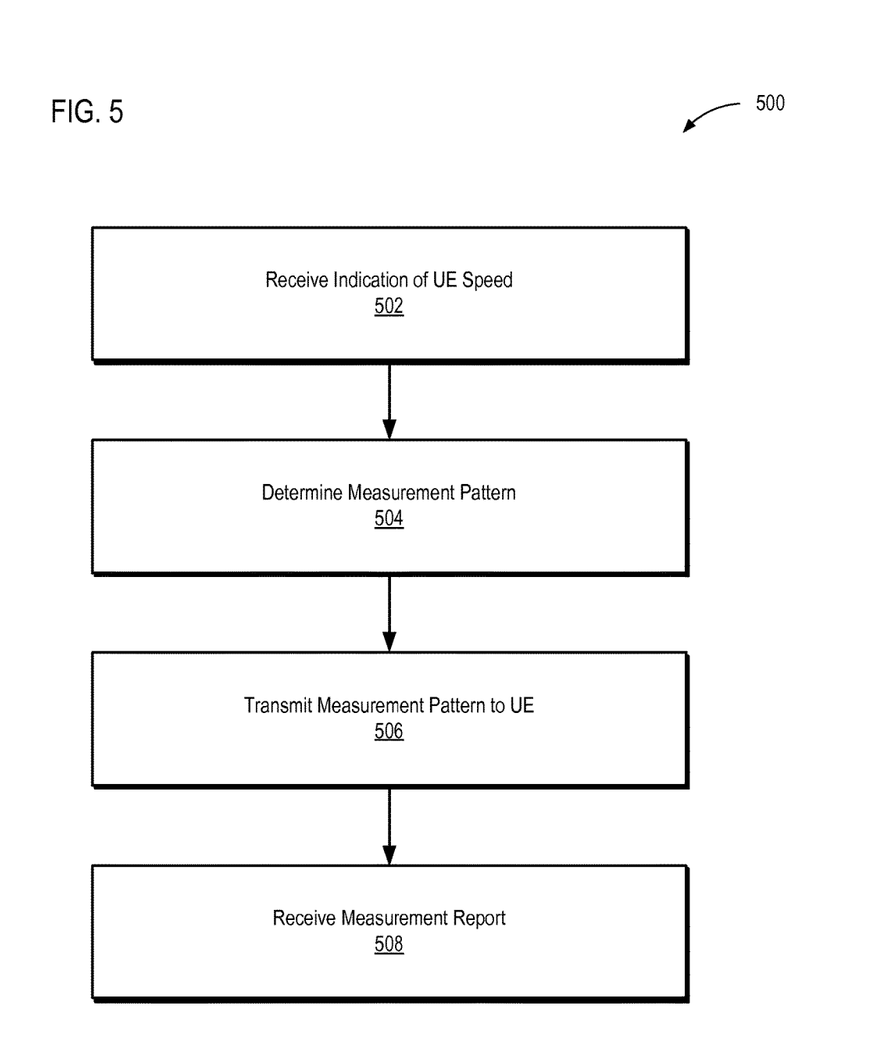
FIG. 5 is a flow diagram of a method for providing a measurement pattern to a UE.

FIG. 5 is a flow diagram of a method 500 for providing a measurement pattern to a UE. The method 500 may begin with receiving 502 an indication of UE speed. The speed may be an estimate of UE speed calculated by the E-UTRAN. The speed may be expressed as a state, such as high speed, low speed, etc. A number of FDD carriers to measure may also be received and/or may have been previously determined.

A measurement pattern may be determined 504. The measurement pattern may indicate when a UE should perform measurements and may be determined based on the indication of the UE speed, the number of FDD carriers to be measured, a cell coverage size, and/or the like. The measurement pattern may be a bitmap with each element indicating whether a measurement should be performed in that time frame. There may be one bitmap per FDD carrier and/or per measurement cycle. The bitmap may include a default value, such as a value of all zeroes, that indicates one frequency cell should be measured per measurement cycle according to a default pattern. When the speed of the UE is a low speed state and/or below a predetermined threshold, the measurement pattern may be determined 504 to be the default pattern. When the number of FDD carriers to be measured is less than or less than or equal to a predetermined threshold, it may also be determined 504 that the measurement pattern should be the default value.

When the UE speed is a high speed state and/or above a predetermined threshold and the number of FDD carrier is above the predetermined threshold, a measurement pattern other than the default value may be determined 504. The measurement pattern may instruct the UE to measure FDD carriers more quickly than the default configuration. When a default value is not used, determining 504 the measurement pattern may include setting bits high that correspond to times when the UE should perform measurements. The bits may be set such that the UE will perform measurements more frequently than under the default scheme but will perform less than one measurement per FDD carrier per measurement cycle to save power.

The determined measurement pattern may be transmitted 506 to the UE, which may include transmitting the default value. The measurement pattern may be transmitted using higher level signaling, such as an RRC reconfiguration message. The RRC message may also include any other parameters needed by the UE to perform the measurements. A plurality of measurement patterns may be transmitted 506, such as one measurement for each FDD carrier to be measured. The UE may perform the measurements of the FDD carriers at the times specified by the measurement pattern(s). A measurement report indicating the results of the measurements may be received 508 from the UE. The measurements may be evaluated to determine whether a new cell should be selected. One or more elements of the method 500 may be repeated at a later point in time if a new cell is not selected.

UE performance may be improved by using measurement patterns to indicate when measurement should occur. The UE may be able to monitor more FDD carriers due to the time saving resulting from using measurement patterns, so the UE may be more likely to connect to an optimal cell. The UE may save energy when more frequent measurements are not required and a default pattern is used, but the UE may also be able to perform more frequent measurements when required by circumstances.

Figure 6:
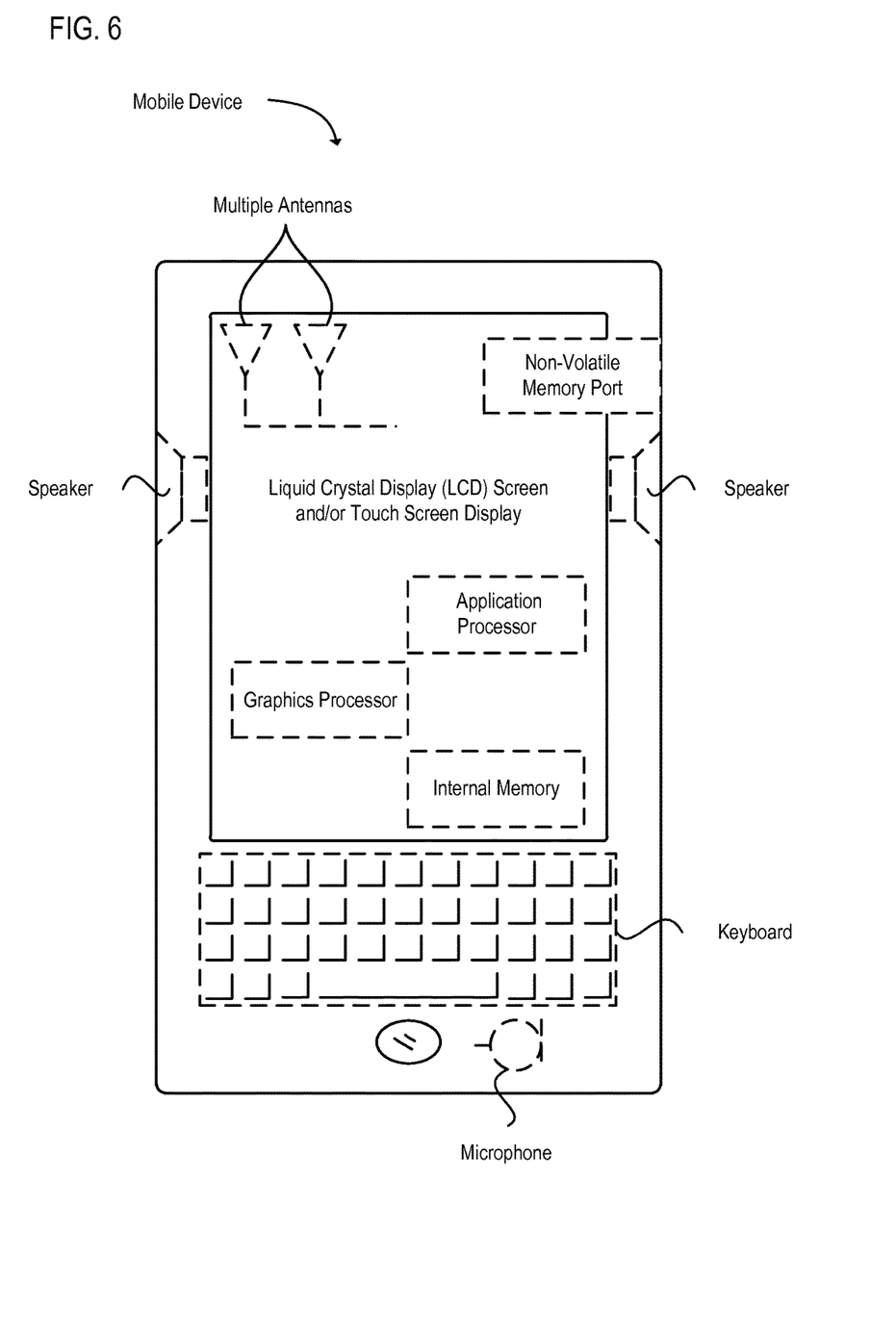
FIG. 6 is a schematic diagram of a UE able to measure one or more frequencies according to a received measurement pattern.

FIG. 6 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 6 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is an eNB for indicating when inter-frequency measurement should be performed. The eNB includes a processor. The processor is configured to receive receive a speed parameter for a UE. The processor is also configured to determine a measurement pattern indicating when an inter-frequency measurement should be performed by the UE. The processor is also configured to transmit the measurement pattern to the UE.

In Example 2, the processor of Example 1 is configured to receive a measurement report including an indication of the results from the inter-frequency measurement.

In Example 3, the measurement pattern of any of Examples 1-2 indicates when the inter-frequency measurement should be performed for a single FDD carrier.

In Example 4, the measurement pattern of any of Examples 1-3 includes a bitmap. Each element of the bitmap corresponds to a subframe of a measurement cycle.

In Example 5, the processor of any of Examples 1-4 transmits the measurement pattern by transmitting an RRC message including the measurement pattern.

In Example 6, the measurement pattern of any of Examples 1-5 uses a default measurement pattern to indicate a single frequency cell should be measured per measurement cycle.

In Example 7, the processor of any of Examples 1-6 determines the default measurement pattern should be used when the speed parameter indicates the UE is travelling at low speed.

In Example 8, the processor of any of Examples 1-7 determines the default measurement pattern should be used when a number of FDD carriers to be measured is less than a predetermined threshold.

Example 9 is a method for indicating frequency measurement parameters. The method includes determining a frequency at which to perform a measurement. A base station operates at the determined frequency. The method also includes selecting a subframe in which a wireless communication device should measure a signal of the base station. The method also includes transmitting an indication of the selected subframe to the wireless communication device.

In Example 10, the method of Example 9 includes receiving an estimate of a speed of the wireless communication device from a mobility control unit.

In Example 11, selecting the subframe of any of Examples 9-10 includes selecting the subframe based on the speed of the wireless communication device.

In Example 12, selecting the subframe of any of Examples 9-11 includes selecting the subframe based on a number of frequencies to be measured.

In Example 13, transmitting the indication of the selected subframe of any of Examples 9-12 includes transmitting a bitmap. A length of the bitmap corresponds to a number of subframes in a measurement cycle.

In Example 14, transmitting the bitmap of any of Examples 9-13 includes transmitting a default value when a speed of the wireless communication device is below a predetermined threshold or a total number of frequencies at which to preform measurements is below a predetermined threshold.

In Example 15, selecting the subframe of any of Examples 9-14 includes selecting the subframe without modifying a duration of the measurement cycle.

Example 16 is a wireless communication device. The wireless communication device includes circuitry. The circuitry is configured to receive measurement configuration information including an indication of a frequency for which a signal should be measured and an indication of a time when the signal should be measured. The circuitry is also configured to measure the signal at the frequency at the indicated time. The circuitry is also configured to transmit results from the measurement to a base station.

In Example 17, the indication of the time of Example 16 includes a vector indicating whether a measurement should be performed in each of a plurality of time divisions.

In Example 18, the circuitry of any of Examples 16-17 is configured to receive a plurality of vectors. Each vector corresponds to a distinct frequency for which a corresponding signal should be measured.

In Example 19, the indication of the time of any of Examples 16-18 includes a default value, and the circuitry measures the signal at one frequency per measurement cycle.

In Example 20, the circuitry of any of Examples 16-19 measures the signal by measuring a signal from a particular source.

In Example 21, the circuitry of any of Examples 16-20 is configured to receive the measurement configuration information via higher layer signaling.

Example 22 is a method for indicating when inter-frequency measurement should be performed. The method includes receiving a speed parameter for a UE. The method also includes determining a measurement pattern indicating when an inter-frequency measurement should be performed by the UE. The method also includes transmitting the measurement pattern to the UE.

In Example 23, the method of Example 22 includes receiving a measurement report including an indication of the results from the inter-frequency measurement.

In Example 24, the measurement pattern of any of Examples 22-23 indicates when the inter-frequency measurement should be performed for a single FDD carrier.

In Example 25, the measurement pattern of any of Examples 22-24 includes a bitmap. Each element of the bitmap corresponds to a subframe of a measurement cycle.

In Example 26, transmitting the measurement pattern of any of Examples 22-25 includes transmitting an RRC message including the measurement pattern.

In Example 27, the measurement pattern of any of Examples 22-26 uses a default measurement pattern to indicate a single frequency cell should be measured per measurement cycle.

In Example 28, determining the measurement pattern of any of Examples 22-27 includes determining the default measurement pattern should be used when the speed parameter indicates the UE is travelling at low speed.

In Example 29, determining the measurement pattern of any of Examples 22-28 includes determining the default measurement pattern should be used when a number of FDD carriers to be measured is less than a predetermined threshold.

In Example 30, determining the measurement pattern of any of Examples 22-29 includes selecting a subframe in which a wireless communication device should perform the inter-frequency measurement.

In Example 31, selecting the subframe of any of Examples 22-30 includes selecting the subframe based on the speed of the wireless communication device.

In Example 32, selecting the subframe of any of Examples 22-31 includes selecting the subframe based on a number of frequencies to be measured.

In Example 33, selecting the subframe of any of Examples 22-32 includes selecting the subframe without modifying a duration of a measurement cycle.

In Example 34, transmitting the measurement pattern of any of Examples 22-33 includes transmitting measurement configuration information via higher layer signaling.

Example 35 is an apparatus including means to perform a method as described in any preceding example.

Example 36 is machine readable storage including machine-readable instructions, which when executed, implement a method or realize an apparatus as described in any preceding example.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. An Evolved Universal Terrestrial Radio Access Network (E-UTRAN) Node B (eNB) for indicating when inter-frequency measurement should be performed to aid in User Equipment (UE) handover, the eNB comprising:
   storage configured to store a measurement report from a UE;
   a processor configured to:
      receive a physical speed parameter for the UE;
      determine a measurement pattern over a period comprising a set of measurement opportunities within a measurement cycle indicating when inter-frequency measurements of frequency division duplexing (FDD) carriers from a set of inter-frequency measurements should be performed by the UE based at least in part on the physical speed parameter, each measurement opportunity indicating when and whether an inter-frequency measurement of a frequency division duplexing (FDD) carrier will take place, wherein the measurement pattern comprises a bitmap, and wherein each element of the bitmap corresponds to a subframe and carrier of a measurement cycle;
      transmit the measurement pattern to the UE;
      receive, from the UE, a measurement report corresponding to the measurement pattern; and
      determine whether to select a target eNB for handover based at least in part on the measurement report.

2. The eNB of claim 1, wherein the processor is further configured to receive a measurement report including an indication of the results from the inter-frequency measurement.

3. The eNB of claim 1, wherein the measurement pattern indicates when the inter-frequency measurement should be performed for a single Frequency Division Duplexing (FDD) carrier.

4. The eNB of claim 1, wherein the processor transmits the measurement pattern by transmitting a Radio Resource Control (RRC) message including the measurement pattern.

5. The eNB of claim 1, wherein a default measurement pattern indicates a single frequency cell should be measured per measurement cycle.

6. The eNB of claim 5, wherein the processor determines the default measurement pattern should be used when the physical speed parameter indicates the UE is travelling at low speed.

7. The eNB of claim 5, wherein the processor determines the default measurement pattern should be used when a number of Frequency Division Duplexing (FDD) carriers to be measured is less than a predetermined threshold.

8. A method for indicating frequency measurement parameters to a wireless communication device by a first base station to aid in selection criteria, the method comprising:
   determining a set of frequencies at which to perform measurements based at least in part on a physical speed of the wireless communication device, wherein a set of base stations operate at the determined set of frequencies;

selecting a set of subframes in which a wireless communication device should measure a set of signals of a plurality of base stations from the set of base stations; and transmitting an indication of the selected set of subframes to the wireless communication device, wherein the indication comprises a bitmap representing the set of subframes, and wherein each element of the bitmap corresponds to a subframe and carrier of a measurement cycle; and receive, from the UE, a measurement report corresponding to the measured set of signals.

9. The method of claim 8, further comprising receiving an estimate of a physical speed of the wireless communication device from a mobility control unit.

10. The method of claim 9, wherein selecting the subframe comprises selecting the subframe based on the physical speed of the wireless communication device.

11. The method of claim 8, wherein selecting the set of subframes comprises selecting the set of subframes based on a number of frequencies to be measured.

12. The method of claim 8, wherein transmitting the indication of the selected subframe comprises transmitting a bitmap, and wherein a length of the bitmap corresponds to a number of subframes in a measurement cycle.

13. The method of claim 12, wherein transmitting the bitmap comprises transmitting a default value when a physical speed of the wireless communication device is below a predetermined threshold or a total number of frequencies at which to perform measurements is below a predetermined threshold.

14. The method of claim 12, wherein selecting the set of subframes comprises selecting the set of subframes without modifying a duration of the measurement cycle.

15. A wireless communication device comprising:
storage configured to store a measurement configuration; and
circuitry configured to:
receive the measurement configuration information using a first frequency division duplexing (FDD) carrier, the measurement configuration information based at least in part on a physical speed of the wireless communication device and including an first indication of a second frequency for which a second signal of a second FDD carrier should be measured and first indication of a first time when the second signal of the second FDD carrier should be measured and an indication of a third frequency for which a third signal of a third FDD carrier should be measured and a second indication of a second time when the third signal of the third FDD carrier should be measured, wherein the measurement configuration comprises a bitmap, and wherein each element of the bitmap corresponds to a measurement opportunity and carrier of a measurement cycle;

measure the second signal of the second FDD carrier at the second frequency at the indicated first time and the third signal of the third FDD carrier at the third frequency at the indicated second time; and transmit results from the measuring to a base station.

16. The device of claim 14, wherein the first indication of the first time comprises a vector indicating whether a measurement should be performed in each of a plurality of time divisions.

17. The device of claim 15, wherein the circuitry is configured to receive a plurality of vectors, and wherein each vector corresponds to a distinct frequency for which a corresponding signal should be measured.

18. The device of claim 14, wherein the first indication of the first time comprises a default value, and wherein the circuitry measures the second signal at one frequency per measurement cycle.

19. The device of claim 14, wherein the circuitry measures the second signal by measuring the second signal from a particular source.

20. The device of claim 14, wherein the circuitry is configured to receive the measurement configuration information via higher layer signaling.

* * * * *